INVENTOR.
EDWARD L. MOYER
BY
Gordon H. Cheney
AGENT

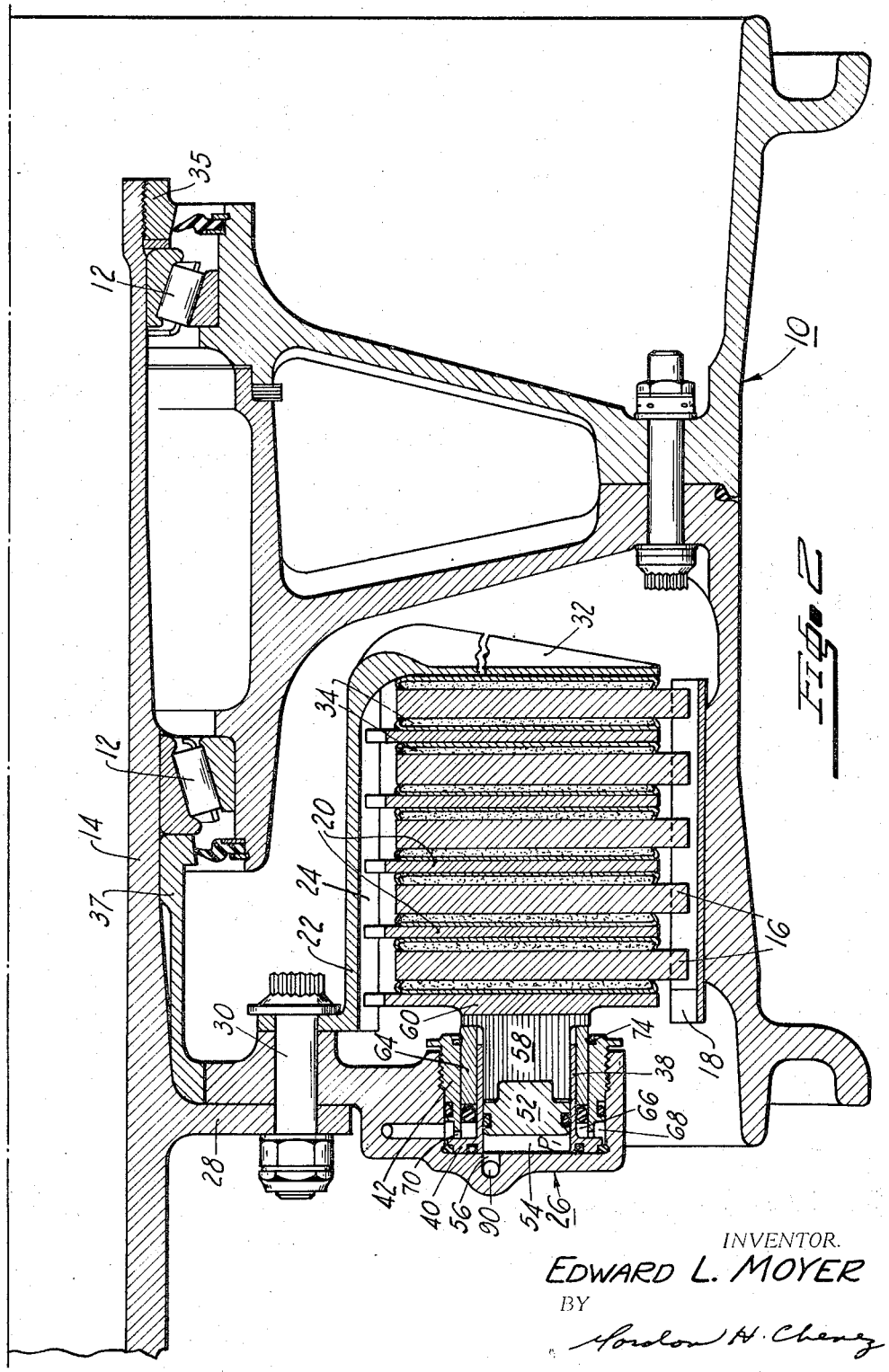

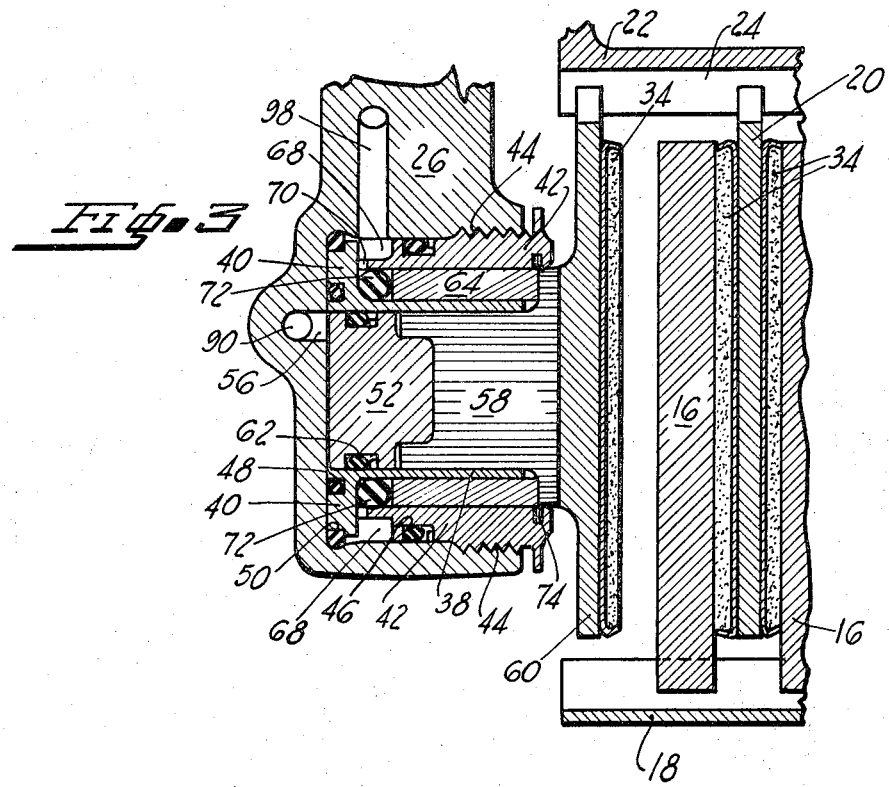
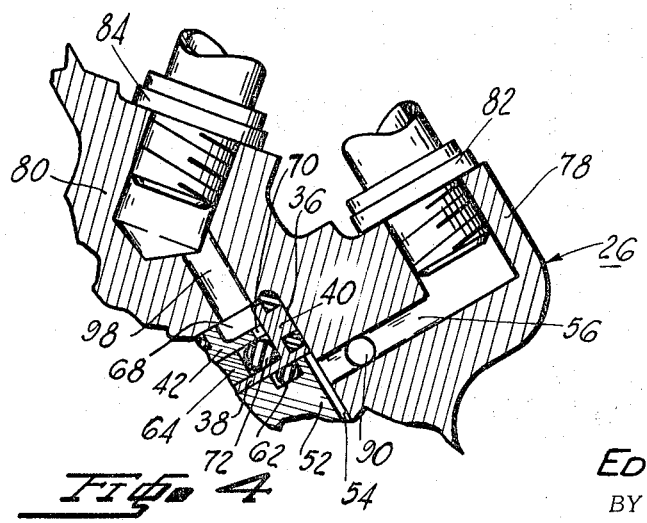

INVENTOR.
EDWARD L. MOYER
BY
AGENT

United States Patent Office 3,312,313
Patented Apr. 4, 1967

3,312,313
INDEPENDENTLY OPERABLE DUAL BRAKE
ACTUATING APPARATUS
Edward L. Moyer, South Bend, Ind., assignor to The
Bendix Corporation, South Bend, Ind., a corporation
of Delaware
Filed June 23, 1965, Ser. No. 466,356
7 Claims. (Cl. 188—106)

The present invention relates, in general, to fluid operated braking apparatus for vehicles and, in particular, to independently operable fluid operated normal and emergency braking apparatus for aircraft.

The present invention is an improvement over the independently operable normal and emergency braking apparatus shown and described in U.S. Patent No. 2,888,-101, issued May 26, 1959, to Alden Bayles and entitled, "Applying System for Disk Brake," common assignee. The present invention represents a more compact arrangement of the actuating piston assemblies and fluid passages connecting the same of said patent, thereby reducing the number of piston-containing assemblies in the carrier member and simplifying carrier member and pressure plate design accordingly. The present improved arrangement also permits conventional rifle drilling in the carrier plate to provide the necessary fluid passages to interconnect the pistons in each of the normal and emergency systems, thereby reducing machining costs, as well as reducing weight and providing for maximum cooling air flow through the brake and around the carrier member and pressure plate in particular.

It is an object of the present invention to provide two independently operable brake actuating means, one of which is immediately available in the event of failure of the other.

It is another object of the present invention to provide two independently operable brake actuating systems wherein the cylinders containing fluid operated piston means for the one system also contains the fluid operated pistons for the other system.

It is an important object of the present invention to provide two independently operable brake actuating means either of which is immediately available for use to the exclusion of the other.

It is a further object of the present invention to provide two independently operable brake actuating systems arranged in a carrier member in such a manner as to conserve space and minimize weight.

It is an important object of the present invention to provide two independently operable brake actuating systems arranged in a carrier member in such a manner as to simplify as well as reduce the required machining of the carrier member to a minimum.

Other objects and advantages of the present invention will be apparent from the following description, taken with the accompanying drawings wherein:

FIGURE 2 represents a sectional view taken on line 2—2 of FIGURE 1 showing the brake in applied position in response to pressurization of one piston;

FIGURE 3 represents an enlarged view of the brake actuating means of FIGURE 2 broken away from the remaining portion of the wheel and brake with both pistons in a de-energized position;

FIGURE 4 represents an enlarged view taken on line 4—4 of FIGURE 1;

Figure 1:
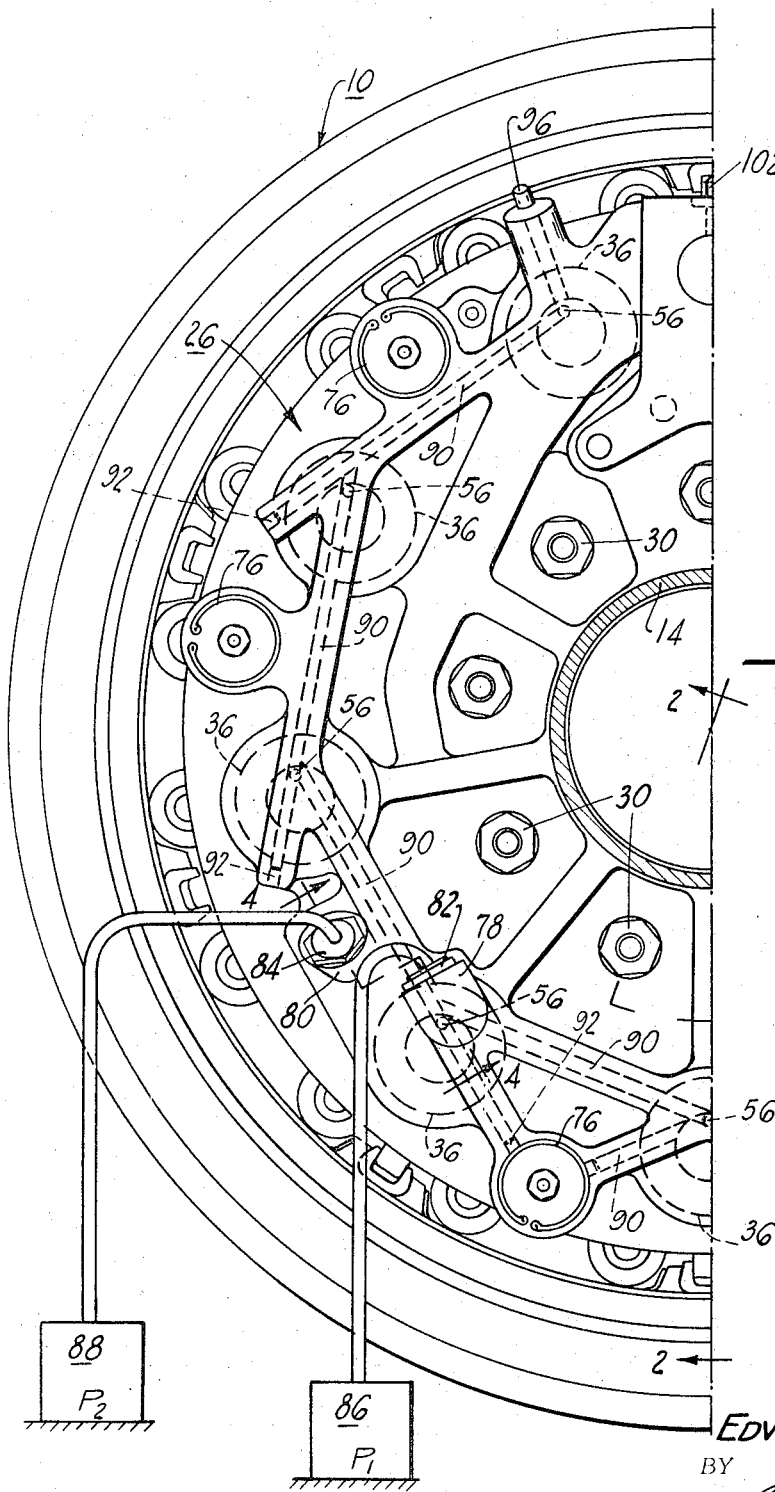
FIGURE 1 represents a plan view of one-half of a wheel and brake assembly embodying the present invention.

Referring to FIGURES 1 and 2, numeral 10 designates an aircraft type wheel assembly mounted for rotation on suitable roller bearings 12 carried by a nonrotatable axle 14. The brake assembly within wheel 10 is of conventional disk design and includes a plurality of rotor members 16 slidably mounted for axial movement relative to wheel 10 by means of circumferentially spaced apart axially extending key members 18 fixedly secured to wheel 10 by any suitable fastening means, not shown. Stator members 20, interposed between adjacent rotor members, are slidably mounted for axial movement to an annular fixed support 22 for axial movement relative to wheel 10 by means of circumferentially spaced apart key members 24. The support 22, as well as a carrier or fluid motor carrier member 26, is fixedly secured to a flange 28 integral with axle 14 by circumferentially spaced apart bolt and nut combinations 30. The carrier 26 may be cast or forged and suitably machined to provide the required form. The support 22 terminates in a reaction plate 32 against which the interleaved rotor and stator members 16 and 20 are forced in stacked frictional engagement when brake application occurs. Friction members 34 suitably fixedly secured to stator members 20 are adapted to frictionally engage rotor members 16, thereby retarding rotational movement of the latter during brake application. The wheel assembly is removably secured to axle 14 by means of nut 35. Spacing member generally indicated by 37 serves to maintain the wheel assembly in spaced apart position axially along axle 14.

The carrier 26 is removably secured to fixed axle 14 by bolt and nut combinations 30 and is provided with a plurality of circumferentially spaced apart cylinders 36, each having a closed end and an open end, the latter and extending axially inwardly. A sleeve 38 having an annular flanged end portion 40 is concentrically arranged within each cylinder 36 and is fixedly secured therein by a second sleeve 42 which has a threaded portion 44 engageable with mating threads formed in the wall of cylinder 36. With sleeve 42 tightened in position as shown, the end of sleeve 42 bears against flanged portion 40, thereby fixedly securing sleeve 38 in position within cylinder 36. A recess 46 and associated O-ring provided therein in sleeve 42 provides a seal against high pressure fluid leakage between adjacent surfaces of sleeve 42 and carrier 26. Recesses 48 and 50 and associated O-rings therein in flanged portion 40 provide a seal against high pressure fluid leakage between adjacent surfaces of end portion 40 and carrier 26.

A piston 52 slidably carried in sleeve 38 partially defines a chamber 54 to which pressurized fluid $P_1$ is introduced via a port 56. The piston 52 bears against a heat insulating member 58 which, in turn, bears against an annular pressure plate 60. The pressure plate 60, like stator members 20, is keyed to annular support 22 for axial movement therealong and is adapted to urge the rotor and stator members 16 and 20 in a compressed state against reaction plate 32. A recess 62 and associated O-ring in piston 52 provides a seal against fluid leakage between adjacent surfaces of piston 52 and sleeve 38.

A second piston 64 concentric with piston 52 and slidably carried between sleeve 38 and sleeve 42 is adapted to bear against member 58 and, like piston 52, when pressurized urges the rotor and stator members 16 and 20 in a compressed state against reaction plate 32. The piston 64 partially defines an annular chamber 66 to which pressurized fluid $P_2$ is introduced via annulus 68 and circumferentially spaced apart passages 70 in sleeve 42. An O-ring 72 disposed in annular chamber 66 bears against the end of piston 64 and is compressed by pressurized fluid $P_2$ thereby acting as a seal against fluid leakage past adjacent surfaces of piston 64 and sleeves 38 and 42. A wiping seal 74 suitably secured to sleeve 42 slidably engages the outermost surface of piston 64.

Referring to FIGURE 1, a plurality of circumferentially spaced apart return springs 76 is suitably connected in a conventional manner to the pressure plate 60 to impose a force thereon which holds the pressure plate in a normally retracted position, thereby releasing the brake in the absence of suitable pressurization of either of the pistons 52 or 64. Inlet ports 78 and 80 formed in carrier 26 are threaded to receive couplings 82 and 84, respectively, which supply pressured fluid from separately controlled first (normal) ($P_1$) and second (emergency) ($P_2$) sources 86 and 88. It will be understood that the sources 86 and 88 may include separate conventional power boost mechanisms, not shown, independently and selectively controlled by the vehicle operator to apply a controlled application of pressurized fluid to the inlet port 78 during normal braking operation or to the inlet port 80 during emergency braking operation as in a case of malfunction or failure of the normal braking system. For an example of such power boost mechanism, reference is made to U.S. Patent No. 2,927,608 issued Mar. 8, 1960 to D. F. Jenkins et al. and entitled "Control Valve For Regulating Brake Applying Pressure," common assignee.

Figure 5:
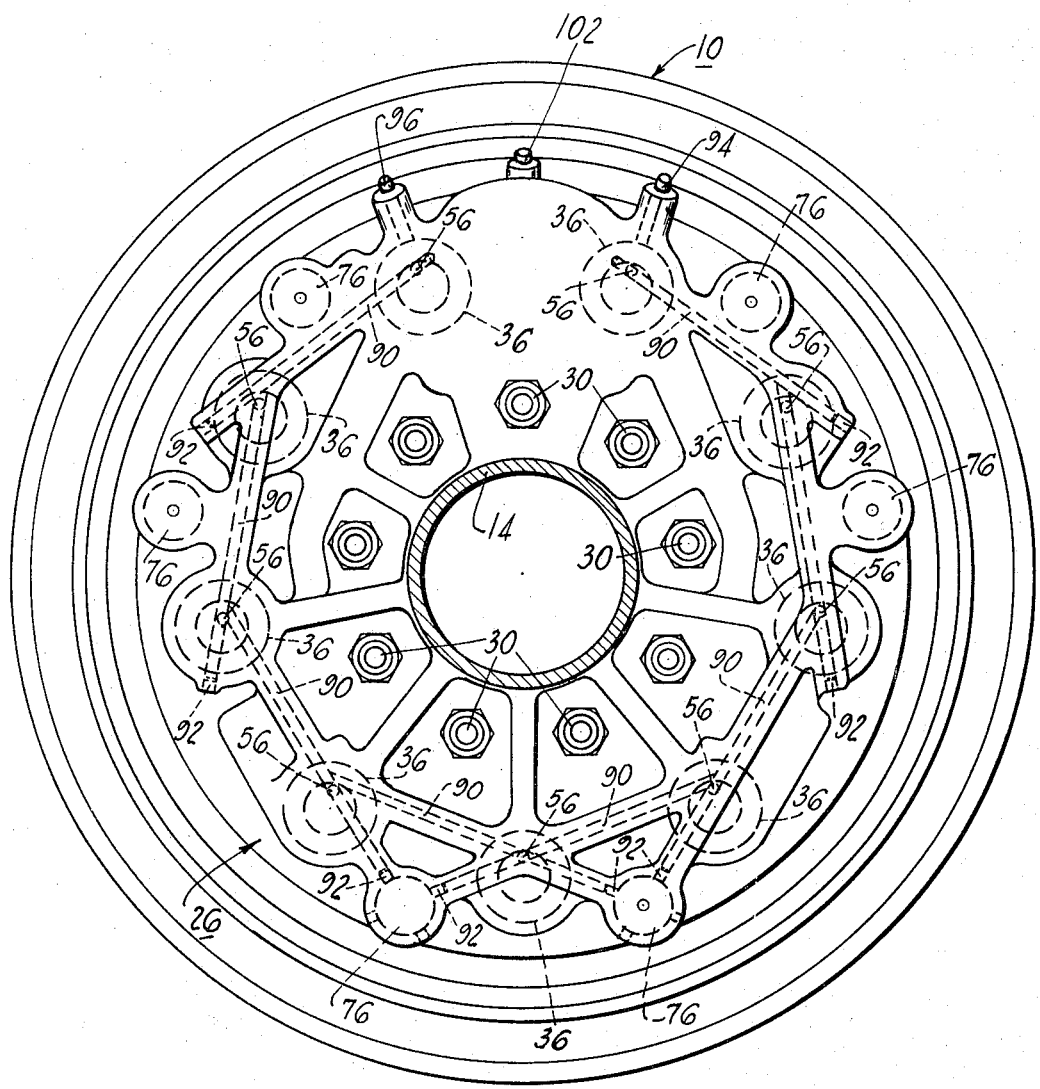
FIGURE 5 represents a plan view of the wheel and brake of FIGURE 1 with portions deleted to more clearly disclose the arrangement of fluid conducting passages communicating pressurized fluid to one set of brake actuating pistons.

Referring to FIGURE 5, the carrier 26 is provided with boss portions through which are formed a plurality of passages 90 angularly disposed relative to one another in a common plane. The passages 90 are adapted to be formed in a relatively simple and straight forward manner in that the carrier 26 can be mounted and processed in conventional automatic machine apparatus whereby the passages 90 can be simply and quickly rifle drilled in sequence by means of indexing of carrier 26. Each passage 90 intercepts an adjacent passage 90, thereby providing a continuous fluid passage as shown in FIGURE 5. The port 56 is drilled outwardly from the base of each cylinder 36 to an associated passage 90. A plug 92 fixedly secured in the open end of each passage 90 serves as a seal against high pressure fluid leakage outwardly therefrom. Bleed ports 94 and 96 communicate with passages 90, thereby providing means for bleeding air from passages 90 as required. Referring to FIGURES 1 and 4, inlet port 78 communicates with one of the passages 90 from which pressurized fluid $P_1$ passes to the remaining passages 90, thereby causing simultaneous pressurization of the pistons 52.

Figure 6:
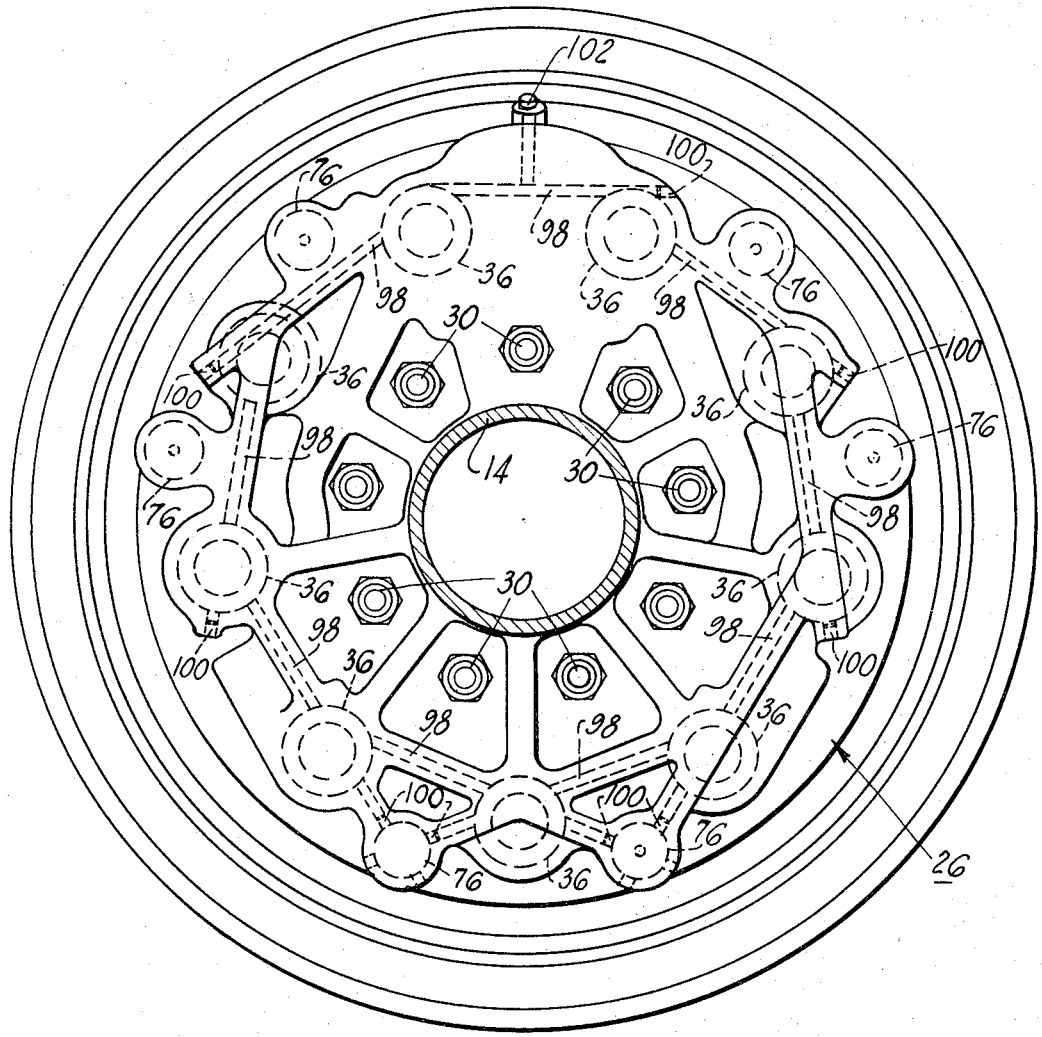
FIGURE 6 represents a plan view similar to FIGURE 5 but taken on a plane below that of FIGURE 5 to show the underlying arrangement of passages communicating pressurized fluid to a second set of brake actuating pistons.

Referring to FIGURE 6, the carrier 26 is provided with a plurality of passages 98 arranged similar to passages 90 in that said passages 98 are angularly disposed relative to one another in a common plane. The plane of passages 98 is parallel to and spaced below the plane of passages 90 and it will be understood that FIGURE 6 represents the structure of FIGURE 5 with that portion of the carrier 26 containing passages 90 removed. The passages 98, like passage 90, are adapted to be simply and quickly rifle drilled in sequence by suitable indexing of carrier 26. Each passage 98 intersects wall portion of two cylinders 36 at the level of the associated annulus 68 defined by sleeve 42, thereby providing an uninterrupted passage for pressurized fluid $P_2$ to each of the chambers 66 via passages 70 in each associated sleeve 42. A plug 100 fixedly secured in the one end of each of the passages 98 serves as a seal against high pressure fluid leakage outwardly therefrom. Bleed port 102 provides for bleeding air from passages 98 as required. Inlet port 80 communicates with one of the passages 98 from which pressurized fluid $P_2$ passes to the remaining passages 98, thereby causing simultaneous pressurization of the pistons 64.

During normal braking operation, the pressurized fluid $P_1$ is selectively applied from source 86 to inlet port 78 by the vehicle operator resulting in simultaneous pressurization of pistons 52 independently of pistons 64 which remain unpressurized. The pressurization of pistons 52 results in a controlled application of the brakes in the aforementioned manner. It will be understood that the pistons 64 may be biased against the member 58 by virtue of residual pressure $P_2$ in chambers 66 but such pressure is not sufficient to cause application of the brake.

In the event that a malfunction of the normal braking system occurs, as for example, a rupture of the conduit carrying pressurized fluid $P_1$ from source 86 to inlet port 78, in which case pressurization of pistons 52 is lost, the alternate or emergency system is brought into operation. To this end, the pressurized fluid $P_2$ is selectively applied from source 88 to inlet port 80 resulting in simultaneous pressurization of the pistons 64 independently of pistons 52 which remain inoperative. The pressurization of pistons 64 results in controlled application of the brake by virtue of the resulting compression of rotor and stator members 16 and 20.

It will be recognized that the two independently operable brake actuating systems are not limited to normal and emergency use as described above. The two systems may be used for normal braking operation whereby both systems are immediately available to the vehicle operator for alternate use as desired.

It will be understood that the sources 86 and 88 may be a pressurized liquid or the source 86 or 88 a pressurized liquid with the remaining source a pressurized gas without affecting the intended function of the braking systems. Furthermore, various changes and modifications in the structure shown and described may be made by those persons skilled in the art without departing from the spirit of applicant's invention.

I claim:
1. Independently operable first and second brake actuating apparatus comprising:
   a carrier member adapted to house both the first and second brake actuating apparatus;
   a cylinder formed in said carrier member;
   a sleeve member concentrically arranged in fixed position in said cylinder and separating said cylinder into first and second chambers;
   a first piston slidably carried in said first chamber and operatively connected to the brake for actuating the same;
   a second piston concentric with said first piston and slidably carried in said second chamber and operatively connected to the brake for actuating the same;
   a first source of controllable pressurized fluid operatively connected to said first chamber for supplying pressurized fluid thereto to actuate said first piston;
   a second source of controllable pressurized fluid operatively connected to said second chamber for supplying pressurized fluid thereto to actuate said second piston;
   said first and second sources of pressurized fluid being independently controllable to cause pressurization of said first piston and said second piston, respectively.
2. Independently operable first and second brake actuating apparatus as claimed in claim 1 wherein:
   one of said sources of pressurized fluid is a pressurized liquid and
   the other of said sources of pressurized fluid is a gas.
3. Independently operable first and second brake actuating apparatus as claimed in claim 1 wherein:
   both of said sources of pressurized fluid are pressurized liquids.

4. Independently operable first and second brake actuating apparatus comprising:
- a carrier member adapted to house both the first and second brake actuating apparatus;
- a plurality of spaced apart cylinders formed in said carrier member;
- a sleeve concentrically arranged in fixed position in each of said cylinders and separating the same into first and second chambers;
- a first piston slidably carried in each of said first chambers and operatively connected to the brake for actuating the same;
- a second piston concentric with said first piston and slidably carried in each of said second chambers operatively connected to the brake for actuating the same;
- first passage means formed in said carrier member and communicating with each of said first chambers for supplying pressurized fluid thereto to actuate said first pistons;
- second passage means formed in said carrier member and communicating with each of said second chambers for supplying pressurized fluid thereto to actuate said second pistons;
- a first source of controllable pressurized fluid operatively connected to said first passage means for supplying pressurized fluid thereto;
- a second source of controllable pressurized fluid operatively connected to said second passage means for supplying pressurized fluid thereto.

5. Independently operable first and second brake actuating apparatus as claimed in claim 4 wherein:
- said plurality of spaced apart cylinders are arranged in a circular pattern; and
- said first passage means includes a plurality of straight passages angularly arranged relative to one another in a common plane to form a substantially circular passage and further includes a passage communicating each of said first chambers with one of said straight passages.

6. Independently operable first and second brake actuating apparatus as claimed in claim 4 wherein:
- said plurality of spaced apart cylinders are arranged in a circular pattern;
- said first passage means includes a plurality of straight passages angularly arranged relative to one another in a common plane to form a substantially circular passage and further includes a passage communicating each of said first chambers with one of said straight passages;
- said second passage means includes a plurality of passages angularly arranged relative to one another in a common plane parallel to said first named plane and communicating with each of said second chambers.

7. Independently operable normal and emergency brake actuating apparatus comprising:
- a carrier member adapted to house both the normal and emergency braking actuating apparatus;
- a plurality of cylinders in spaced apart relationship formed in said carrier;
- a sleeve member concentrically arranged in each of said cylinders and separating said cylinder into first and second chambers;
- means threadedly engaged with said carrier member and engageable with said sleeve for fixedly securing the latter in position in said cylinder;
- a first piston slidably carried in each of said first chambers and operatively connected to the brake for actuating the same;
- a second piston slidably carried in each of said second chambers and operatively connected to the brake for actuating the same independently of said first pistons;
- a first source of controllable pressurized fluid operatively connected to said first chambers for supplying pressurized fluid thereto to actuate said first pistons;
- a second source of controllable pressurized fluid operatively connected to said second chambers for supplying pressurized fluid thereto to actuate said second pistons;
- said first and second sources of pressurized fluid being independently controllable to cause pressurization of said first pistons during normal braking operation and to cause pressurization of said second pistons for emergency operation.

References Cited by the Examiner

UNITED STATES PATENTS

| | | | |
|---|---|---|---|
| 2,497,438 | 2/1950 | Butler | 188—152 |
| 2,888,101 | 5/1959 | Bayles | 188—106 X |
| 2,956,549 | 10/1960 | Malpass | 92—152 X |
| 3,155,197 | 11/1964 | Lee et al. | 188—106 X |

FOREIGN PATENTS

| | | |
|---|---|---|
| 1,300,709 | 7/1962 | France. |

DUANE A. REGER, *Primary Examiner.*